United States Patent
Touchstone (10) Patent No.: US 7,841,553 B2
(45) Date of Patent: Nov. 30, 2010

(54) FISHING LINE TRANSFER ASSEMBLY AND KIT

(76) Inventor: Ian Touchstone, 4211 Wildwood Dr., Crystal Lake, IL (US) 60014

( * ) Notice: Subject to any disclaimer, the term of this patent is extended or adjusted under 35 U.S.C. 154(b) by 0 days.

(21) Appl. No.: 12/583,243

(22) Filed: Aug. 17, 2009

(65) Prior Publication Data

US 2009/0308969 A1  Dec. 17, 2009

(51) Int. Cl.
  *B65H 49/00* (2006.01)
  *B65H 16/02* (2006.01)
  *A01K 87/00* (2006.01)

(52) U.S. Cl. ................ 242/129.8; 242/902; 242/129.6; 242/590; 43/25

(58) Field of Classification Search ................ 242/902, 242/590, 595, 596, 596.7, 596.1, 571.3, 129.51, 242/129.53, 129.6, 129.8, 422.4; 43/25
See application file for complete search history.

(56) References Cited

U.S. PATENT DOCUMENTS

| | | | |
|---|---|---|---|
| 2,903,196 A | 9/1959 | Fowler | |
| 3,595,497 A | 7/1971 | Boatright | |
| 3,776,485 A | 12/1973 | Foley | |
| 3,799,471 A | 3/1974 | Morris | |
| 3,950,881 A | 4/1976 | Hays | |
| 4,151,966 A | 5/1979 | Lindsay | |
| 4,360,172 A | 11/1982 | Cope | |
| 4,776,527 A | 10/1988 | Prowant | |
| 4,795,107 A | 1/1989 | Williams | |
| 4,948,059 A | 8/1990 | Lewitt | |
| 4,958,784 A | 9/1990 | Totten | |
| 5,029,409 A | 7/1991 | Nouwens | |
| D348,301 S | 6/1994 | Smith | |
| 5,513,463 A | 5/1996 | Drinkwater | |
| 5,544,839 A | 8/1996 | Burch | |
| 5,839,687 A | 11/1998 | Magnafici | |
| 5,855,085 A | 1/1999 | Jinks, Jr. | |
| 5,906,329 A | 5/1999 | Wesley, Sr. | |
| 6,224,011 B1 | 5/2001 | Gavaza, III | |
| 6,254,029 B1 | 7/2001 | Robertson et al. | |
| D456,483 S | 4/2002 | Cryer | |
| 6,609,673 B1 | 8/2003 | Johnson | |
| 6,629,658 B2 | 10/2003 | Lu | |
| 6,651,921 B1 | 11/2003 | Travis | |
| 6,671,993 B1 | 1/2004 | Routt | |
| 6,742,737 B1 | 6/2004 | Connor | |
| 6,926,218 B2 | 8/2005 | Perrin | |
| 2004/0035973 A1 | 2/2004 | Henrion | |
| 2006/0006276 A1* | 1/2006 | Wyatt | 242/588 |

* cited by examiner

*Primary Examiner*—Evan H Langdon (57) ABSTRACT

A fishing line spool support, line guide mechanism, and kit incorporating the same enables users thereof to transfer line from a spool assembly to a reel assembly. The spool support comprises a spool-bearing portion and opposed rails extending in parallel relation to one another away from the spool-bearing portion. A line guide mechanism rides along the rails and comprises spool interfacing structures borne by a carriage member of the mechanism for interfacing with the opposed rims of a spool as borne by the spool support. Together the carriage member and interface units provide line-guiding stop structure for preventing or minimizing line migration during line transfer.

20 Claims, 9 Drawing Sheets

FISHING LINE TRANSFER ASSEMBLY AND KIT

BACKGROUND OF THE INVENTION

1. Prior History

This application claims the benefit of pending U.S. patent application Ser. No. 12/148,149, filed in the United States Patent and Trademark Office on Apr. 17, 2008.

2. Field of the Invention

The present invention generally relates to the art of devices for aiding the transfer of fishing line from a spool to a reel assembly. More particularly, the present invention relates to the art of a fishing line spool support and guide mechanism for enabling users thereof to transfer fishing line from a fishing line spool assembly as a line source to a fishing line reel as a line destination.

3. Description of the Prior Art

The sport of fishing is ancient. As is well known to the fishing enthusiast, fishing line in a rod and reel assembly is often lost in various lengths over time and usage. The line or the reel must therefore be replaced on occasion. Fishing line, however, is typically modestly priced as compared to reel assemblies and thus is often sold wound around line replacement spool assemblies. The line, however, must be transferred form the spool assembly to the reel assembly, which, without the aid of spool support means, is often cumbersome. Further, as noted in U.S. Pat. No. 5,839,687 ('687 patent), which issued to Magnafici et al., improper fishing line transfer can cause the line to twist. Twisted line inhibits the fishing operation by, among other things, reducing the ability to cast. A number of devices have been developed as a means to aid the fishing enthusiast to more easily and properly transfer line from a spool assembly to a reel assembly. Some of the more pertinent prior art relating to this subject is set forth in more detail hereinafter.

U.S. Pat. No. 4,948,059 ('059 patent), which issued to Lewitt, discloses a Tensioning Device for a Fishing Line. The '09 patent teaches a tensioning device for a fishing line comprising a base member secured to a stationary structure. The base member has two outwardly extending arms, one of which is adjustable toward and away from the other. A take off spool of bulk fishing line is rotatably supported between the arms of the base member. Resistance to the take off spool is applied during rotation to keep the fishing line under tension when transferred onto a fishing reel by one person.

U.S. Pat. No. 4,958,784 ('784 patent), which issued to Totten, discloses a Collapsible Spool Holder for Fishing Line. The '784 patent teaches a collapsible spool holder comprising a base plate, two pivot arms, and two pins to hold the arms on the sides of the base plate and a shaft that snaps into the pivot arms. It is used to hold fishing line spools so as a person can replenish the fishing line on the reel of their poles. First one screws the base plate onto a hard, smooth surface (tackle box, boat, etc.), then the shaft is snapped out of the pivot arms. Next the shaft is inserted into the middle of the spool and snapped back into the slots of pivot arms. The product stays stationary so as one could unwind the fishing line from the spool which rotates with its flanges in contact with the relieved radius or shallow concave groove upon pivoting of the arms under gravity influence onto the reel of one's fishing pole.

The '687 patent discloses certain Means and Method for Transferring Fishing Line from a Storage Spool to a Fishing Reel on a Fishing Rod. The '687 patent teaches a one-piece hanger element comprising a central section which rotatably supports a spool of fishing line and has a shoulder that engages a fishing rod to releasably support the spool of fishing line on the rod while fishing line is fed from the spool to the reel to load that reel. Arms on the hanger element prevent the spool from falling off the central section, and one of the arms is spreadable to adjust the tension on the fishing line as it is fed from the spool to the reel. The hanger element can be sold with the spool as a unit.

U.S. Pat. No. 6,742,737 ('737 patent), which issued to Connor, discloses a Fishing Line Feeder Spool Support. The '737 patent teaches a fishing line feeder spool support comprising a pair of flexible arms which are adapted to grip a fishing rod ahead of a fishing reel mounted thereon. The feeder spool support comprises a threaded shaft which rotatably supports a spool of fishing line while the fishing line is installed onto the fishing reel through the operation of the reel crank. A flanged nut is threaded onto the shaft to hold the spool. The line tension can be adjusted by tightening the flanged nut against the spool, thereby adjusting the pulling force needed to remove line from the supply spool. A crankable supply spool can also be installed on the shaft to remove and store fishing line from the fishing reel for later replacement on the reel.

From a review of these publications and other prior art generally known in the relevant art, it will be seen that the prior art does not teach a spool support having elastically deformable appendages for retaining the spool assembly in place during line transfer, and which spool support may further comprise an elastically deformable Z-shaped plane configuration for enhancing anchored engagement with peripheral or external support or anchoring structure(s). The prior art thus perceives a need for a spool support having elastically deformable spool-bearing portions for rotatably receiving and supporting a spool assembly, which spool support may further comprise Z-shaped plane configuration(s) for enhancing anchored engagement with external support structure.

SUMMARY OF THE INVENTION

Accordingly, it is an object of the present invention to provide certain novel means for effectively transferring fishing line from a spool assembly to a reel assembly. It is another object of the present invention to provide certain means for transferring fishing line from a spool assembly to a reel assembly which means and spool assembly can be provided as a packaged kit. To achieve these and other readily apparent objectives, the present invention essentially discloses a fishing line spool support for enabling a user to rotatably anchor a fishing line spool assembly for transferring line therefrom The spool support may comprise a single rod bent or angled at a plurality of points intermediate its length to effect a three-dimensional structure having a spool-support portion and parallel rails or carriage-bearing members extending therefrom. A spool of fishing line may be mounted upon the spool support portion intermediate the carriage bearing rail members.

A line guide mechanism is borne by the rail members and displaceable intermediate the length thereof. The guide mechanism comprises a carriage member and opposed spool interface units. The spool interface units are slidably borne by the carriage member and thus displaceable intermediate its. The spool interface units engage opposed rims of a spool. Line being transferred from the spool is thereby stopped from migrating into spaces beyond the spool interface units and carriage member. The carriage member and spool interface units provide stop structures for preventing line entanglement and thus function to guide line from the spool to the reel assembly.

The carriage member is displaceable along the length of the rails for accommodating spools having varied outer rim diameters, and the spool interface units are displaceable along the length of the carriage member for accommodating spools having varied heights. The carriage member may be spring actuated so as to forcefully return or direct the carriage member and spool interface units toward the spool for ensuring continual stop structure intermediate the line guide and the spool. Further, the total assembly or kit may comprise a spool insert device cooperable with the spool support portion for accommodating spools having varied inner diameters.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of patent drawings.

DETAILED DESCRIPTION OF THE PREFERRED EMBODIMENT

Referring now to the drawings with more specificity, the preferred embodiment of the present invention generally provides a line transfer assembly and/or kit comprising, in combination, a line guide mechanism 10 and spool support 12 for preventing line migration or entanglement as fishing line 106 is transferred from a spool 11 to or toward a reel assembly. The line guide mechanism 10 according to the present invention is generally illustrated fully assembled in FIGS. 1-4, and 6.

This application claims the benefit of U.S. patent application Ser. No. 12/148,149 ('149 application), filed in the United States Patent and Trademark Office on Apr. 17, 2008, which application claimed the benefit of U.S. patent application Ser. No. 11/706,792 ('792 application), filed in the United States Patent and Trademark Office on Feb. 14, 2007. The line guide mechanism 10 according to the present invention is believed superior in design to the washers (as described and referenced at 50 in the '792 application), and is considered a replacement to the washers for defining the line guiding means of the '792 application.

In contrast to the washer form of line guiding means earlier disclosed, the line guide mechanism 10 is forced toward the mounted spool assembly 11 by way of elastic return forces inherent in compression coils 13 outfitted upon the parallel rails 14 of the spool support 12. The washers of the parent application were forced toward the spool assembly of the parent invention by way of their own weight and angled relationship of the spool support. The compression coils 13 or similar other means for forcing the line guide mechanism 10 are believed superior to the washers in design at least insofar as eliminating the need to angle the spool support 12 for weight-forcing structure toward the spool assembly 11.

The line guide mechanism 10 according to the present invention comprises a carriage member or cross bar 15 and certain spool-interfacing structure exemplified by opposed spool interface units 16. The carriage member 15 has sufficient member length to extend intermediate the parallel rails 14, and may thus be borne by the rails 14 and displaceable along and/or intermediate the rail lengths.

In this last regard, the carriage member 15 preferably comprises certain rail-receiving apertures 17 similar in design to the center aperture of the previously disclosed washers. The rails 14 are thus received by the apertures 17 and enable the carriage member 15 to slide or become otherwise displaced along the rails 14.

The spool interface units 16 similarly comprise carriage-receiving apertures 18 and may thus be borne by the carriage member 15 and displaceable intermediate the length of the carriage member 15. It should be noted that a spool 11 may be essentially defined as a cylindrical device having a rim or ridge at each end and an axial hole (as at 101) for a pin or spindle and on which material (as fishing line 106) is wound.

The carriage member 15 is displaceable along the length of the rails 14 for accommodating spools 11 having varied outer rim diameters, and the spool interface units 16 are displaceable along the length of the carriage member 15 for accommodating spools 11 having varied heights.

Figure 7:
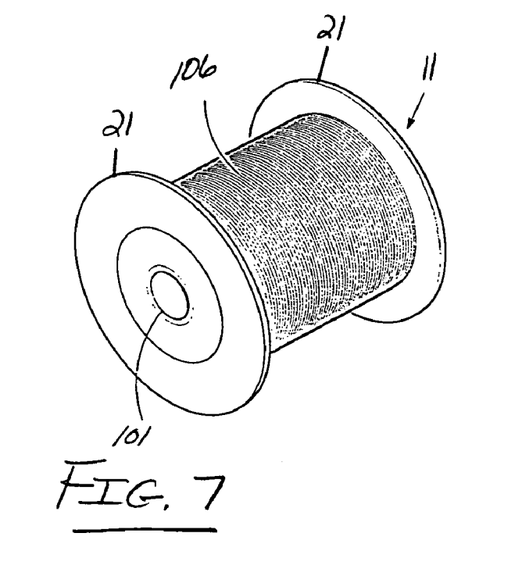
FIG. 7 is a perspective view of a first spool assembly having a first depth and a first diameter and usable in combination with the line transfer assembly of the present invention.
Figure 8:
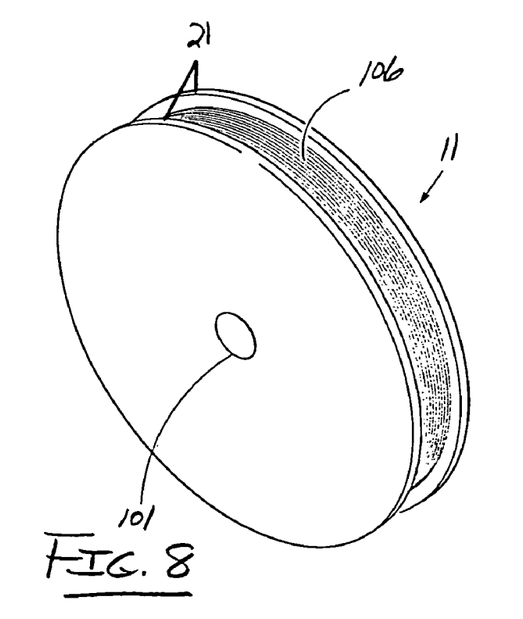
FIG. 8 is a perspective view of a second spool assembly having a second depth and a second diameter usable in combination with the line transfer assembly of the present invention.
Figure 9A:
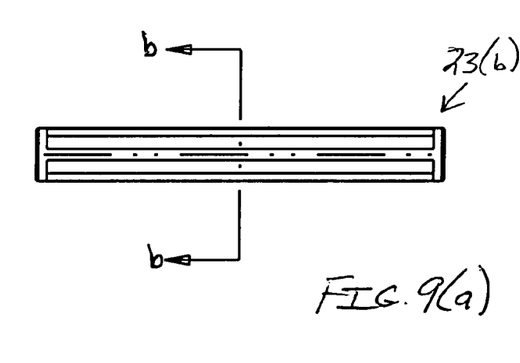
FIG. 9(a) is a side plan view of a first spool insert with a first select diameter.
Figure 9B:
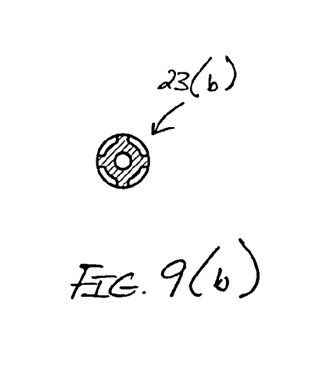
FIG. 9(b) is a sectional view of the spool insert as sectioned through the spool insert at "b-b" in FIG. 9(a) to more clearly show the first select diameter.
Figure 9C:
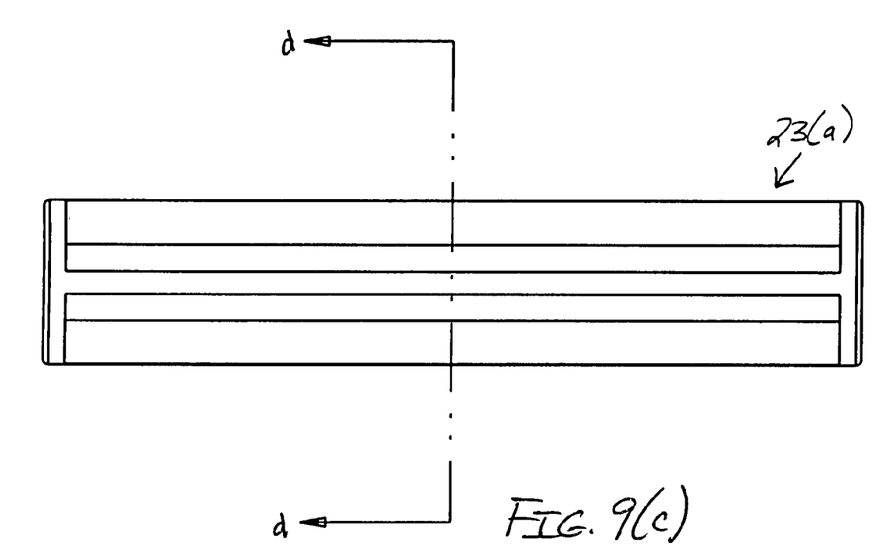
FIG. 9(c) is a side plan view of a second spool insert with a second select diameter.
Figure 9D:
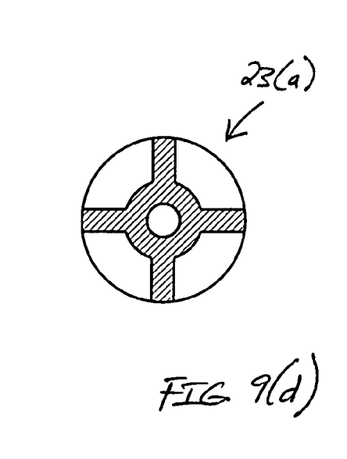
FIG. 9(d) is a sectional view of the spool insert as sectioned through the spool insert at "d-d" in FIG. 9(c) to more clearly show the second select diameter.
Figures 10A, 10B, 10C:
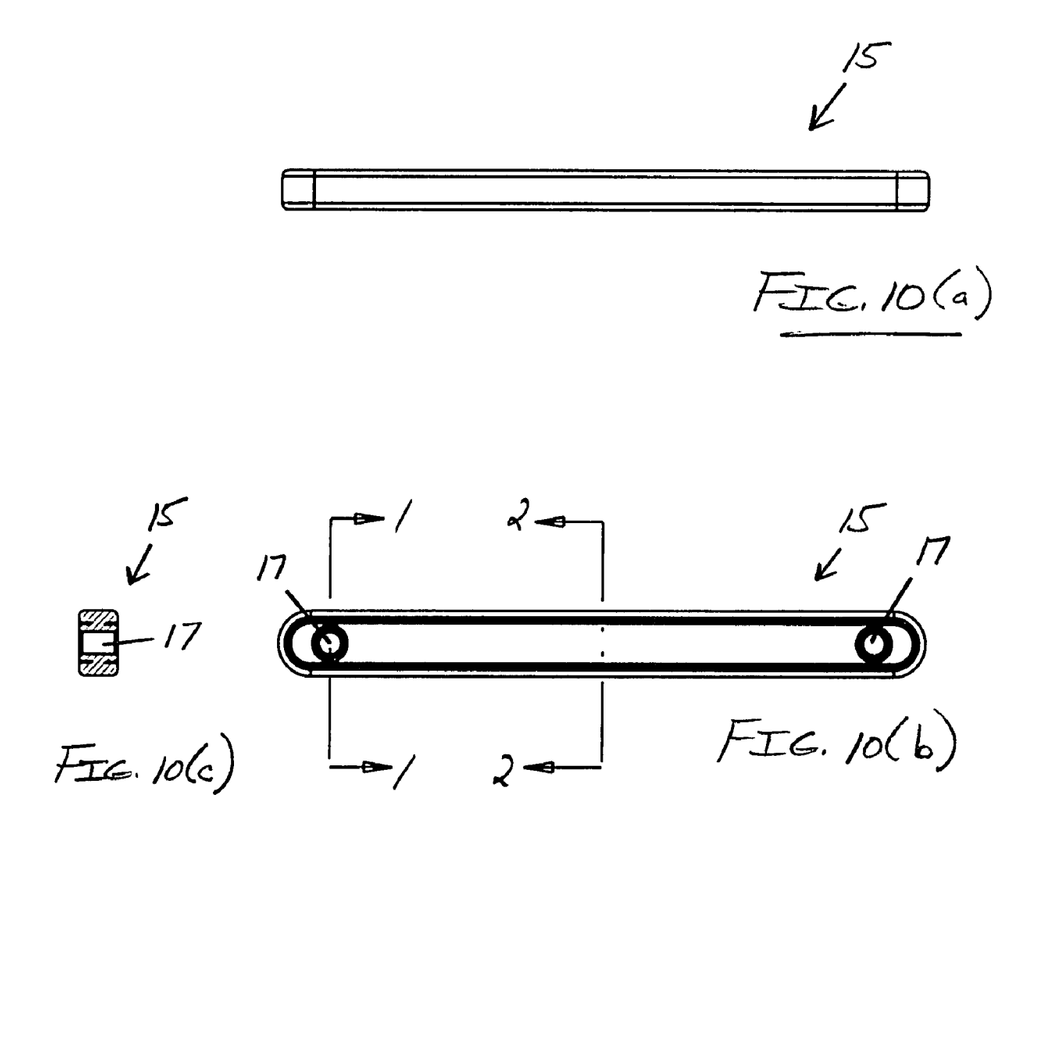
FIG. 10(a) is a side plan type depiction of the carriage member of the line guide mechanism.
FIG. 10(b) is a top plan type depiction of the carriage member of the line guide mechanism.
FIG. 10(c) is a sectional view of the carriage member as sectioned through the carriage member at "1-1" in FIG. 10(b).
Figure 10D:
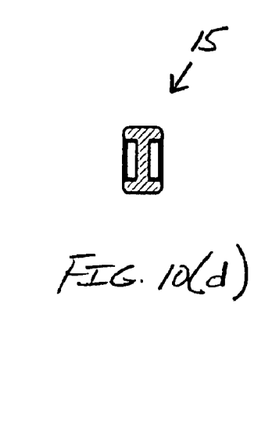
FIG. 10(d) is a sectional view of the carriage member as sectioned through the carriage member at "2-2" in FIG. 10(b).
Figure 11A:
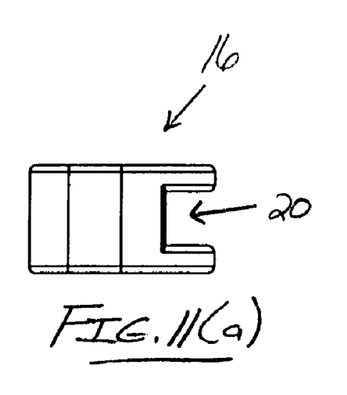
FIG. 11(a) is a side view of one spool interface unit showing a rim-receiving groove.
Figure 11B:
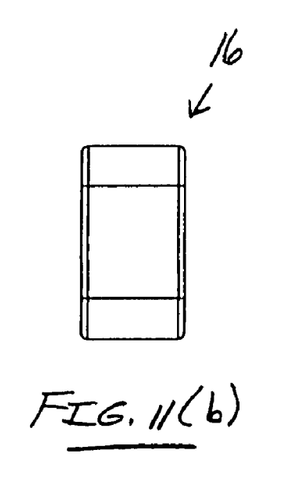
FIG. 11(b) is a back view of the spool interface unit otherwise depicted in FIG. 11(a).
Figure 11C:
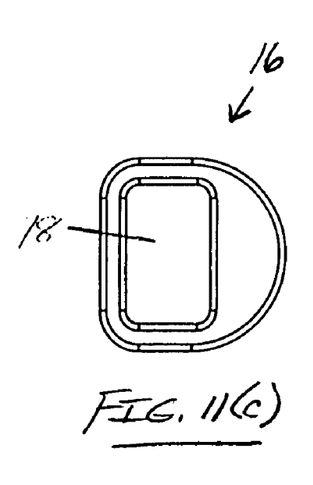
FIG. 11(c) is a top view of the spool interface unit otherwise depicted in FIG. 11(a) showing a carriage-receiving aperture.
Figure 11D:
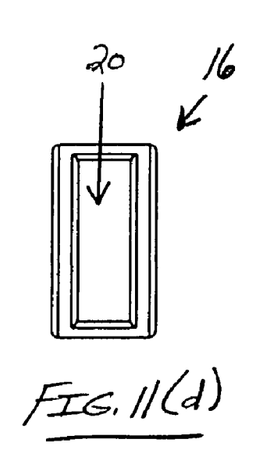
FIG. 11(d) is a front view of the spool interface unit otherwise depicted in FIG. 11(a) showing the rim-receiving groove.

In this last regard, the reader is directed to FIGS. 7 and 8. From a comparative inspection of the noted figures, it may be seen that FIG. 7 generally depicts a first spool assembly 11 having a first spool depth or height and a first outer rim diameter and that FIG. 8, generally depicts a second spool assembly 11 having a second spool depth or height and a second outer rim diameter. The first outer rim diameter of the first spool assembly 11 shown in FIG. 7 is lesser in magnitude than the second outer rim diameter of the second spool assembly 11 shown in FIG. 8. Further, the first spool height is greater in magnitude as compared to the second spool height.

Accordingly, if each of the spool assemblies 11 shown in FIGS. 7 and 8 were mounted upon the (axially-aligned) spool mounting portion(s) 19 of the spool support 12, the carriage member 15 would be displaced a shorter distance from the spool assembly 11 shown in FIG. 7 as compared to the spool assembly shown in FIG. 8. Further, the spool interface units 16 would be displaced a greater distance from one another for the spool assembly 11 shown in FIG. 7 as compared to the spool assembly shown in FIG. 8.

It may be seen from an inspection of the various figures that the spool interface units 16 engage the flanges or rims 21 of a flanged spool or spool assembly 11 as borne by the spool-bearing or spool-mounting portion(s) 19 of the spool support 12, and that the carriage member 15 and spool interface units 16 provide line-guiding stop structure adjacent the spool 11 as borne upon the spool-mounting portion(s) 19.

Figure 1:
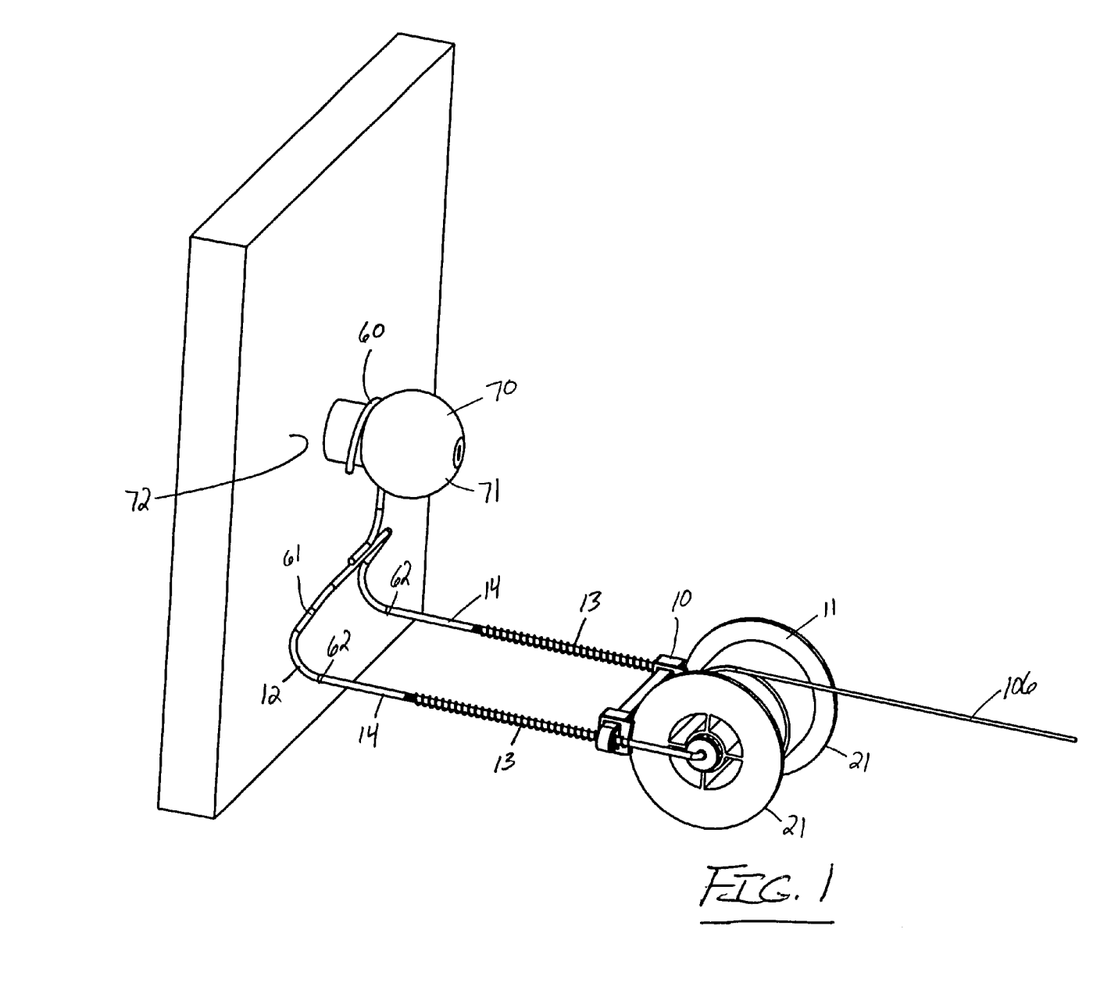
FIG. 1 is a top perspective view of a fully assembled fishing line transfer assembly according to the present invention bearing a spool with line being transferred therefrom, and showing a spool support, a line guide mechanism, a spool insert, and a pair of compression coils axially received on opposed rails of the spool support, the spool support being anchored to a door knob via a J-shaped hook member.
Figure 2:
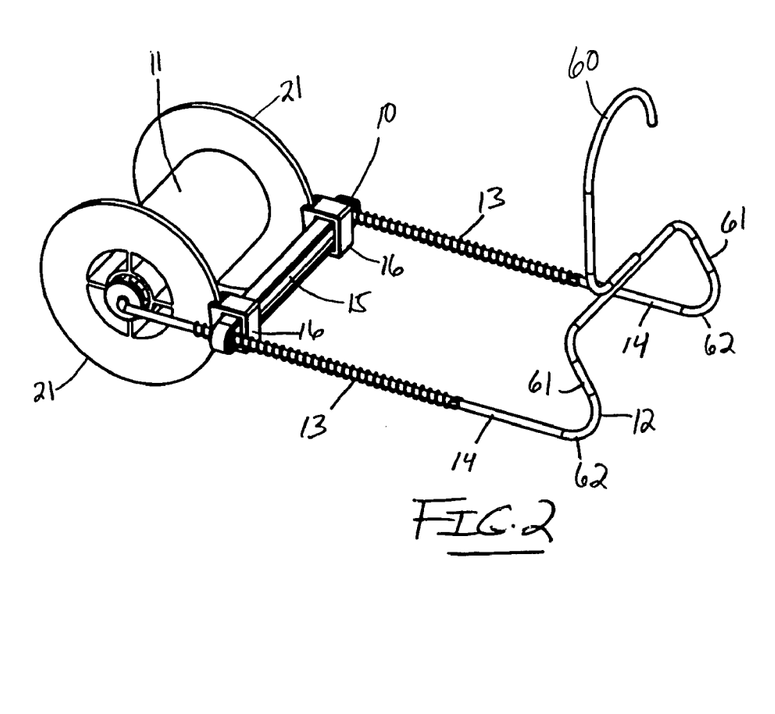
FIG. 2 is a top perspective view of a fully assembled fishing line transfer assembly according to the present invention bearing a spool and showing the spool support, the line guide mechanism, a select spool insert, and a pair of compression coils axially received on opposed rails of the spool support.
Figure 3:
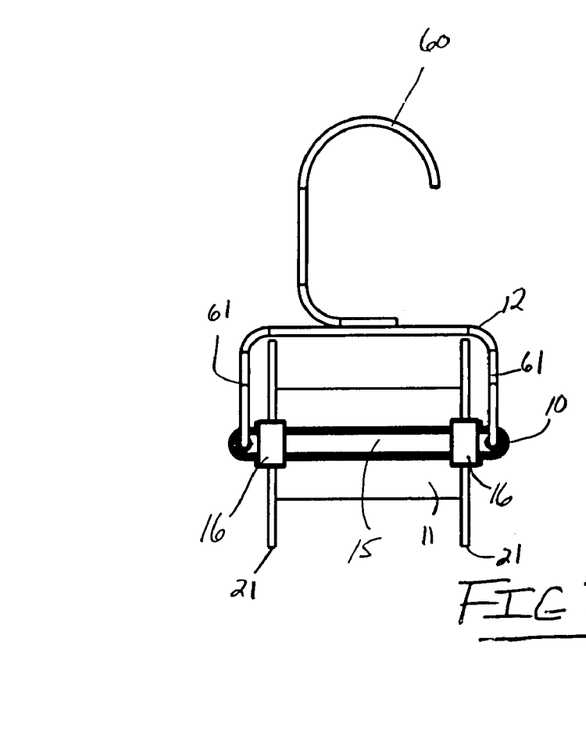
FIG. 3 is an end view of a fully assembled fishing line transfer assembly according to the present invention bearing a spool and showing the spool support with J-shaped hook member and line guide mechanism.
Figure 4:
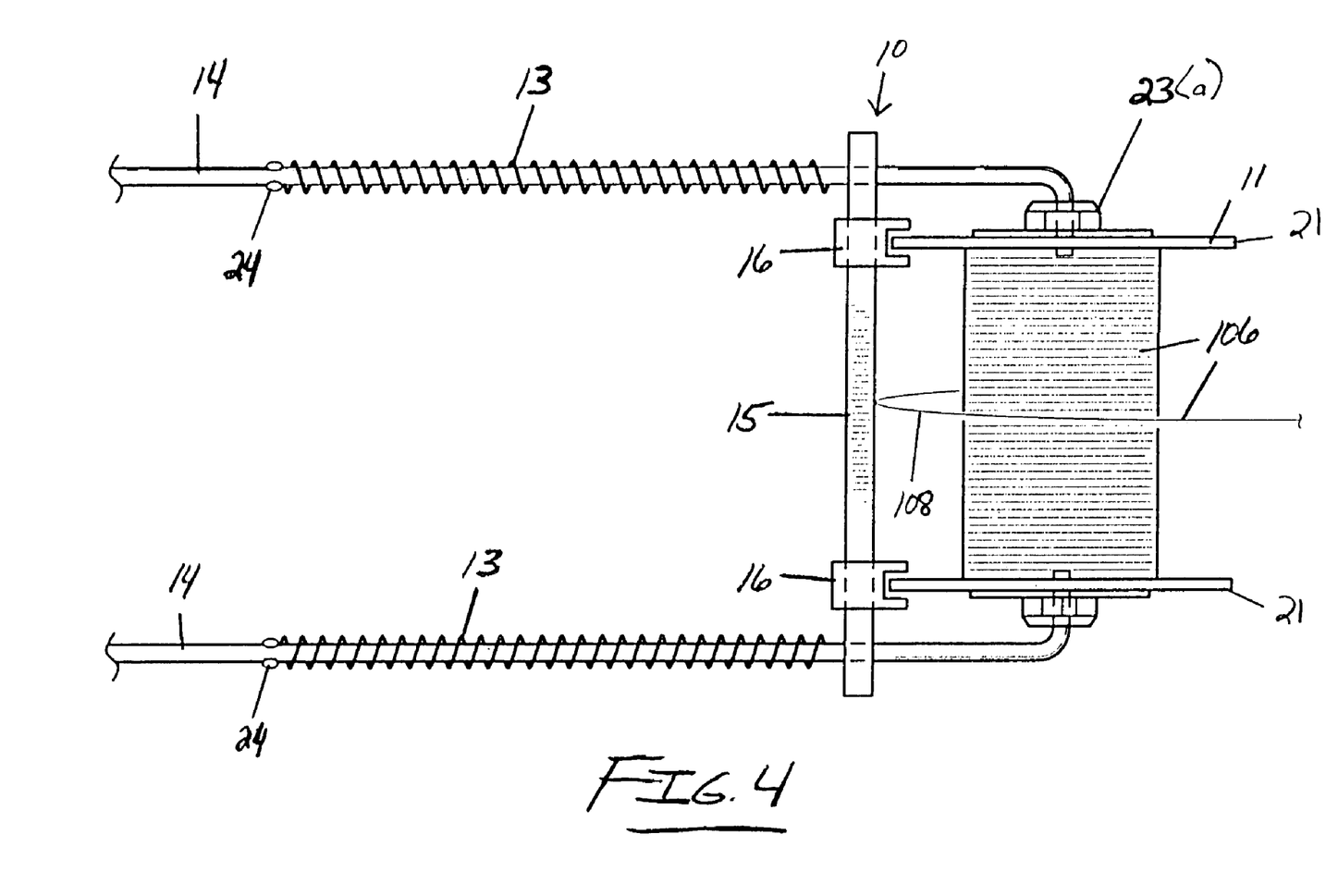
FIG. 4 is a fragmentary plan type depiction of the line transfer assembly bearing a spool with line being transferred therefrom and showing opposed rails of the spool support, the line guide mechanism, a select spool insert, and a pair of compression coils axially received on the opposed rails.
Figure 5:
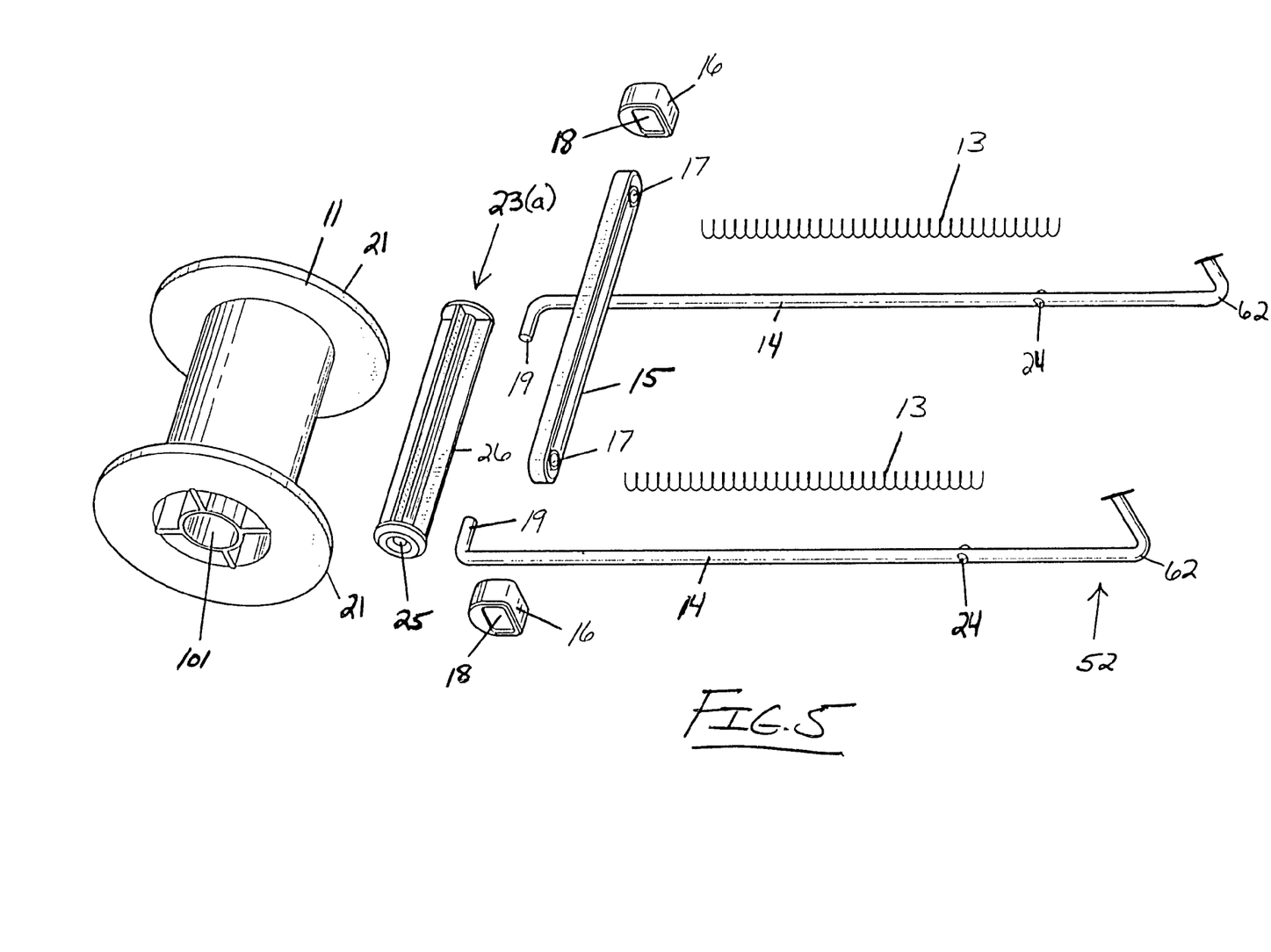
FIG. 5 is a top perspective view of an exploded fishing line transfer assembly and spool showing a fragmentary spool support, the line guide mechanism with carriage member and a pair of spool interface units, a select spool insert, and a pair of compression coils.
Figure 6:
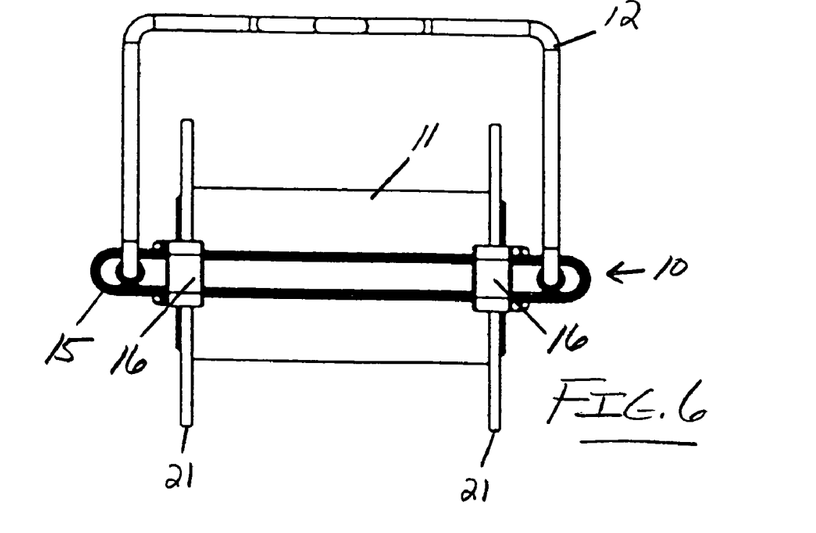
FIG. 6 is an end view of a fishing line transfer assembly bearing a spool and showing an alternative spool support, and a line guide mechanism.

In this last regard, the reader should note that grooves 20 of the spool interface units 16 receive or otherwise engage the flanges or rims 21 of the spool assembly 11 and extend toward the carriage member 15 from flanges or rims 21. The carriage member 15 extends medially intermediate the spool interface units 16 and together the units 16 and carriage member 15 function to prevent slack line 108 from otherwise being entangled in the space adjacent the spool assembly 11 as generally depicted in FIG. 4.

In other words, the units 16 and carriage member 15 provide stop structure that functions to guide slack line 108 back into close radial adjacency to a mounted spool assembly 11 or within radial extremes as defined by the rims 21 of the mounted spool assembly 11. Essentially, the line-guiding means as defined by the line guide mechanism 10 function to limit the radial distance of line 106 otherwise transferable from a spool assembly 11. It is thus contemplated that the line-guiding means of the present invention may well function to keep the transfer of line 106 uninterrupted and entanglement-free.

With particular reference to the compression coils 13, it should be noted that the rails 14 may be provided with certain stop structure as at 24 for fixing first ends of the compression coils 13. The second ends of the compression coils 13 are placed into contact with the carriage member 15 for forcing the carriage member 15 and spool interface units 16 toward the mounted spool assembly 15. These means for forcing the guide mechanism 10 toward the spool 11 as borne upon the spool-bearing portion(s) are believed to eliminate gaps intermediate the guide mechanism 10 and spool 11 and thus enhance the line-guiding function.

The focus of this application is the line guide mechanism 10 as usable in combination with spool support 12. The essential structure(s) usable in combination with the line guide mechanism 10 are opposed carriage bearing rails 14 that are substantially parallel to one another, the (axially-aligned) spool-bearing or spool-mounting portion(s) 19, and the J-shaped hook member or anchoring means as depicted and referenced at 60, which hook member 60 has been depicted as hooking or anchoring the spool support 12 to a door knob 70 in FIG. 1, but is perhaps most clearly shown in FIGS. 3 and 12(c).

Figure 12A:
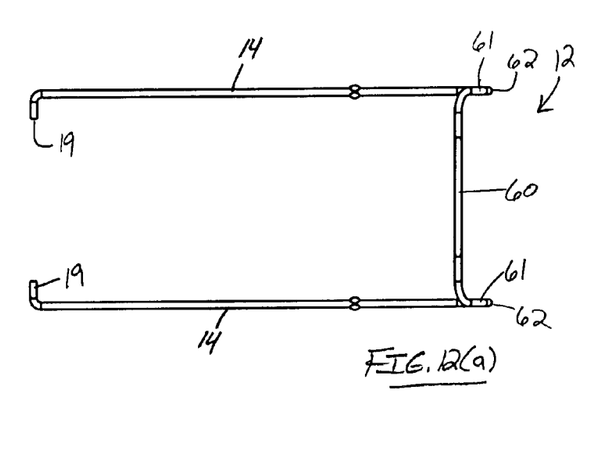
FIG. 12(a) is a top plan view of the preferred spool support according to the present invention showing the parallel rails.
Figure 12B:
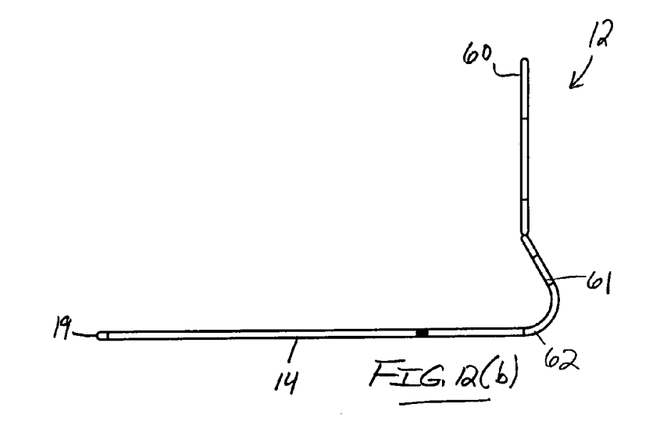
FIG. 12(b) is a side plan view of the preferred spool support according to the present invention showing the J-shaped hook member extending orthogonally relative to the rails.
Figure 12C:
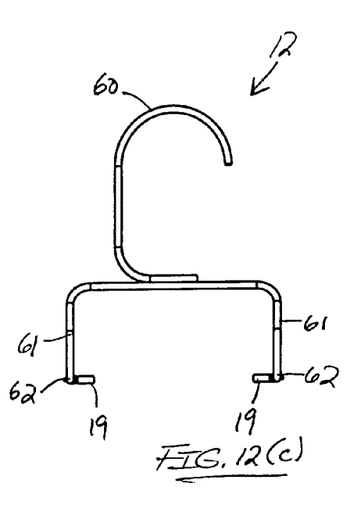
FIG. 12(c) is a end view of the preferred spool support according to the present invention showing the J-shaped hook member extending upwardly relative to the rails termini.

It may be seen from a general and comparative inspection of FIGS. 12(a) through 12(c) that the J-shaped hook member 60 generally extends orthogonally from the rails, but is separated thereby by curved upright portions 61. Curved upright portions space the hook member 60 from the tail termini at 62 for better cooperating with the external anchoring means or support structures such as door knob(s) 70. Notably, the bulbous portion 71 of the door knob 70 extends a distance from the door 72. Portions 61 space the hook member 60 inwardly from the rail termini 62 so as to better accommodate this type of structural feature of external supports and anchors.

The spool assembly 11 may thus be mounted upon the spool-mounting portion(s) 19 intermediate the rails 14 and the line guide mechanism 10 may well function to guide line 106 as it is transferred from the spool assembly 11. The line guide mechanism 10 functions independently from the end 52 of the spool support 12 opposite the spool-mounting portion(s) 19. The end 52 as referenced in this application is substantially equivalent to the portions referenced at 32 in the '149 application.

The fishing line spool support 12 is designed for use in combination with a spool assembly 11 as is the line guide mechanism 10. Bearing these notions in mind, it is further contemplated that the essential teachings of the present invention may be said to disclose a fishing line transfer assembly or kit incorporating the spool support 12 and spool assembly 11.

The transfer assembly or kit may further include the line guide mechanism 10, the compression coils 13 which may be axially received upon the rails 14 of the spool support 12, and a supply of spool inserts. In this regard, at least two spool inserts are contemplated, as at 23(a) and 23(b). The supply of spool inserts is included in the design in order to more properly interface the spool-bearing portion(s) 19 of the spool support 12 with the inner diameter of the axial spool hole 101 commonly found on fishing line spool assemblies.

In other words, the axial spool hole 101 of a spool assembly 11 may receive the spool insert 23(a) and the opposed recesses 25 (or axial insert hole 102) formed in the insert 23(a) and sized and shaped for rotatably receive the axially aligned spool-bearing portion(s) 19 such that rotational movement is substantially uniform about a single axis of rotation (i.e. excess space is minimized for reducing play at the junction between the bearing portion(s) 19 and the insert recesses 25). The spool insert 23(a) may further preferably comprise spoke sections 26 radially extending from the axis of the insert 23(a) at 90° intervals for enhancing frictional contact between the insert 23(a) and the inner diameter of the axial spool hole 101 of the spool assembly 11. The primary difference between inserts 23(a) and insert 23(b) is the diameter of each for more properly interfacing with the spool assembly at the axial spool hole 101.

While the above description contains much specificity, this specificity should not be construed as limiting the scope of the invention, but rather as an exemplification of the invention. For example, the invention according to the foregoing specifications may be described as a fishing line transfer assembly and/or kit including a line guide mechanism for enabling a user to effectively transfer line from a spool to a reel assembly.

The transfer assembly according to the foregoing may be said to comprise, in combination a spool support as at 12 and a guide mechanism as at 10. The spool support essentially comprises a spool-bearing portion and parallel rails extending from the spool-bearing portion, which rails each have a certain rail length.

The guide mechanism 10 essentially comprises a carriage member and opposed spool interface units. The carriage member has a certain member length, and is borne by the rails, being displaceable along the rail lengths. The spool interface units are borne by the carriage member and are displaceable along the member length.

The spool interface units comprise grooves for engaging opposed flanges or rims of a spool as borne by the spool-bearing portion. The carriage member and spool interface units together provide line-guiding stop structure adjacent the spool as borne upon the spool-bearing portion.

The transfer assembly may further comprise certain means for forcing the guide mechanism toward the spool as borne upon the spool-bearing portion and as means for eliminating gaps intermediate the guide mechanism and spool and enhancing the line-guiding function of the transfer assembly. These means for forcing the guide mechanism toward the spool may be preferably defined by certain spring means, as have been exemplified by opposed compression coils outfitted upon the rails of the spool support.

The transfer assembly may further comprise certain means for interfacing the spool-bearing portion of the spool support with the spool, which means further function to enhance spool rotation at the spool-bearing portion. Enhanced spool rotation may be described by rotation about a uniform single axis of rotation and thereby providing a more uniform tension in the line being transferred from the spool to the reel assembly.

The means for interfacing the spool-bearing portion with the spool may be defined by a spool insert comprising opposed axial-aligned recesses and means for frictionally engaging an inner diameter of the spool, the recesses for rotatably receiving the spool-bearing portion. The means for frictionally engaging the inner diameter of the spool may be preferably defined by spoke sections radially extending from an insert axis.

Accordingly, although the invention has been described by reference to a preferred embodiment with certain alternative renderings, and a kit incorporating the same, it is not intended that the novel guide mechanism and/or transfer assembly be limited thereby, but that modifications thereof are intended to be included as falling within the broad scope and spirit of the foregoing disclosure, the following claims and the appended drawings.

I claim:

1. A fishing line transfer assembly for enabling a user to transfer line from a spool to a reel assembly, the transfer assembly comprising, in combination:

a spool support, the spool support comprising a spool-bearing portion, parallel rails axially extending from the spool-bearing portion, and a J-shaped hook member extending orthogonally from the rails opposite the spool-bearing portion, the rails each having a rail length, the J-shaped hook member for hooking the spool support to external anchoring means; and a guide mechanism, the guide mechanism comprising a carriage member and opposed spool interface units, the carriage member having a member length and opposed member ends, the opposed member ends each having a rail-receiving aperture, the rails being received by the rail-receiving apertures such that the carriage member is borne by the rails relatively orthogonal thereto and displaceable along the rail lengths, the spool interface units each having a member-receiving aperture and a U-shaped flange-receiving portion, the spool interface units receiving the member length intermediate the rails thereby being borne by the carriage member and displaceable along the member length intermediate the rails, the U-shaped flange-receiving portions of the spool interface units for receiving opposed, parallel spool flanges of a spool borne by the spool-bearing portion, the carriage member and spool interface units for providing line-guiding stop structure adjacent the spool flanges.

2. The transfer assembly of claim 1 comprising means for axially forcing the guide mechanism coaxial with the rails toward the spool such that the U-shaped, flange-receiving portions frictionally engage the opposed spool flanges of the spool as borne upon the spool-bearing portion, said means for enhancing the line-guiding function of the transfer assembly.

3. The transfer assembly of claim 2 wherein said means for axially forcing the guide mechanism coaxial with the rails toward the spool are defined by spring means, said spring means being elastically actuable for forcing the guide mechanism toward the spool.

4. The transfer assembly of claim 3 wherein said spring means are defined by parallel, axially extending and opposed compression coils, the compression coils being coaxially borne by the rails.

5. The transfer assembly of claim 4 comprising means for interfacing the spool-bearing portion with the spool, said means for interfacing the spool-bearing portion with the spool for further enhancing spool rotation at the spool-bearing portion.

6. The transfer assembly of claim 5 wherein said means for interfacing the spool-bearing portion with the spool is defined by a cylindrical spool insert, the cylindrical spool insert comprising opposed axially-aligned recesses and means for frictionally engaging an inner diameter of the spool, the recesses for rotatably receiving the spool-bearing portion.

7. The transfer assembly of claim 6 wherein the means for frictionally engaging the inner diameter of the spool are defined by spoke sections radially extending from an insert axis.

8. A fishing line transfer assembly for enabling a user to transfer line from a spool to a reel assembly, the transfer assembly comprising, in combination:

a spool support, the spool support comprising a spool-bearing portion, parallel rails axially extending from the spool-bearing portion, and anchoring means for anchoring the spool support to an external anchor, the rails each having a rail length; and a guide mechanism, the guide mechanism comprising a carriage member and opposed spool interface units, the carriage member having a member length and opposed member ends, the opposed member ends each having a rail-receiving aperture, the rails being received by the rail-receiving apertures such that the carriage member is borne by the rails relatively orthogonal thereto and displaceable along the rail lengths, the spool interface units each having a member-receiving aperture and a U-shaped flange-receiving portion the spool interface units receiving the member length intermediate the rails thereby being borne by the carriage member and displaceable along the member length intermediate the rails, the U-shaped flange-receiving portions of the spool interface units for receiving opposed, parallel flanges of a spool borne by the spool-bearing portion, the carriage member and spool interface units for providing line-guiding stop structure adjacent the spool as borne upon the spool-bearing portion.

9. The transfer assembly of claim 8 comprising means for axially forcing the guide mechanism coaxial with the rails toward the spool such that the U-shaped, flange-receiving portions frictionally engage the opposed spool flanges of the spool as borne upon the spool support, said means for axially forcing the guide mechanism coaxial with the rails toward the spool for further eliminating gaps intermediate the spool interface units and spool flanges and enhancing the line-guiding function of the guide mechanism.

10. The transfer assembly of claim 9 wherein said means for axially forcing the guide mechanism coaxial with the rails toward the spool are defined by spring means, said spring means being elastically deformable for forcing the guide mechanism toward the spool.

11. The transfer assembly of claim 10 wherein said spring means comprise parallel, axially extending and opposed compression coils, the compression coils being coaxially borne by the rails for providing spring return forces for forcing the U-shaped flange-receiving portions into frictional engagement with the spool flanges.

12. The transfer assembly of claim 11 comprising means for interfacing the spool support with the spool, said means for interfacing the spool-bearing portion with the spool for further enhancing spool rotation upon the spool support.

13. The guide mechanism of claim 12 wherein said means for interfacing the spool support with the spool are defined by a select spool insert as selected from a supply of spool inserts, each spool insert from the supply of spool inserts comprising a select diameter and axially-aligned recesses, the select diameter for enhancing the interface between the spool support and the spool, the recesses for rotatably receiving axially-aligned and opposed portions of the spool support.

14. The guide mechanism of claim 13 wherein each spool insert comprise spoke sections radially extending from an insert axis.

15. A fishing line transfer kit for enabling a user to transfer line from a spool to a reel assembly, the transfer kit comprising:

a line guide mechanism for enabling a user to guide fishing line from a flanged spool, the guide mechanism comprising a carriage member and spool-interfacing units, the carriage member having a member length and opposed member ends, the opposed member ends each having a rail-receiving aperture, the spool interface units each having a member-receiving aperture and a U-shaped flange-receiving portion, the spool interface units receiving the member length thereby being borne by the carriage member and axially displaceable along the member length, the U-shaped flange-receiving portions of the spool interface units for receiving opposed, parallel spool flanges of a spool, the carriage member and spool interface units for providing line-guiding stop structure adjacent spool flanges of the spool.

16. The transfer kit of claim 15 comprising a spool support, the spool support comprising a spool-bearing portion, parallel rails axially extending from the spool-bearing portion, and anchoring means opposite the spool bearing portion, the rails each having a rail length, the rails being received by the rail-receiving apertures such that the carriage member is borne by the rails relatively orthogonal thereto and displaceable along the rail lengths.

17. The transfer kit of claim 15 comprising means for axially forcing the spool-interfacing units toward the flanged spool coaxial with the rails such that the U-shaped, flange-receiving portions frictionally engage the opposed spool flanges of the spool, said means for axially forcing the guide mechanism coaxial with the rails toward the spool for further eliminating gaps intermediate the spool-interfacing units and the flanged spool and enhancing the line-guiding function of the line guide mechanism.

18. The transfer assembly of claim 17 wherein said means for axially forcing the guide mechanism coaxial with the rails toward the flanged spool comprise a supply of compression coils coaxially bearable by the rails.

19. The transfer kit of claim 15 comprising means for interfacing the spool support with the flanged spool, said means for interfacing the spool-bearing portion with the spool for further enhancing spool rotation upon the spool support.

20. The transfer kit of claim 19 wherein said means for interfacing the spool support with the flanged spool are defined by a supply of cylindrical spool inserts, each spool insert having a select diameter for enhancing the interface between the spool support and the flanged spool.

* * * * *